United States Patent
Kuttenreich et al.

(10) Patent No.: US 12,510,650 B2
(45) Date of Patent: Dec. 30, 2025

(54) RADAR REFLECTOR FOR REFLECTING RADAR RADIATION AND SYSTEM FOR CONTROLLING AUTOMATED OPERATION OF A MOTOR VEHICLE

(71) Applicant: MAN Truck & Bus SE, Munich (DE)

(72) Inventors: Fabian Kuttenreich, Munich (DE); Susann Hofmann, Munich (DE)

(73) Assignee: MAN Truck & Bus SE, Munich (DE)

( * ) Notice: Subject to any disclaimer, the term of this patent is extended or adjusted under 35 U.S.C. 154(b) by 293 days.

(21) Appl. No.: 18/018,838

(22) PCT Filed: Jul. 14, 2021

(86) PCT No.: PCT/EP2021/069598
§ 371 (c)(1),
(2) Date: Jan. 30, 2023

(87) PCT Pub. No.: WO2022/023039
PCT Pub. Date: Feb. 3, 2022

(65) Prior Publication Data
US 2023/0358878 A1    Nov. 9, 2023

(30) Foreign Application Priority Data
Jul. 30, 2020   (DE) ................... 10 2020 120 181.8

(51) Int. Cl.
*G01S 13/75* (2006.01)
*G01S 13/931* (2020.01)

(52) U.S. Cl.
CPC ............ *G01S 13/75* (2013.01); *G01S 13/931* (2013.01); *G01S 2013/9329* (2020.01)

(58) Field of Classification Search
CPC ................ G01S 13/75; G01S 13/931; G01S 2013/9329; G01S 7/412; G01S 2013/9316;
(Continued)

(56) References Cited

U.S. PATENT DOCUMENTS 2,543,130 A *  2/1951  Robertson .............. H01Q 15/14
                                                     343/912
5,424,737 A    6/1995  Lindell
(Continued)

FOREIGN PATENT DOCUMENTS

CN    108427103 A    8/2018
CN    109387812 A    2/2019
(Continued)

OTHER PUBLICATIONS

CN110308425A_Description_20250107_1544.pdf—translation of CN110308425A (Year: 2019).*
(Continued)

*Primary Examiner* — David R Dunn
*Assistant Examiner* — Yonghong Li
(74) *Attorney, Agent, or Firm* — Weber Rosselli & Cannon LLP

(57) ABSTRACT

The invention relates to a radar reflector (1) for reflecting radar radiation (2), comprising at least one reflection element (5) rotatable about a central axis (4) of the radar reflector (1) and an adjusting device (7) for changing and/or parameterizing a characteristic of a radar echo (3) of the radar reflector (1). At least one of the following parameters can be changed by means of the adjusting device (7): the angular velocity ω of rotational motion of the at least one reflection element (5) about the central axis (4); an effective reflection area of the at least one reflection element (5); and a fastening position p of the at least one reflection element (5) relative to the central axis (4). The invention also relates to a system for controlling automated operation of a motor vehicle, comprising at least one radar reflector of this type, and to a motor vehicle (23), which has a radar sensor (24) and is designed to automatedly carry out a predefined
(Continued)

sequence of driving maneuvers in accordance with a sensed characteristic of the radar echo of the radar reflector.

23 Claims, 4 Drawing Sheets

(58) Field of Classification Search
CPC ..... G01S 7/4095; G01S 7/415; G05D 1/0257; H01Q 1/3233; H01Q 15/14; H01Q 15/16; H01Q 3/04; H01Q 3/08
See application file for complete search history.

(56) References Cited

U.S. PATENT DOCUMENTS

| | | | | |
|---|---|---|---|---|
| 10,585,170 | B2* | 3/2020 | Hellinger | G01S 7/4026 |
| 11,175,383 | B2* | 11/2021 | Qiu | G01S 7/4026 |
| 2003/0090411 | A1* | 5/2003 | Haney | G01S 7/4026 |
| | | | | 342/174 |
| 2016/0377702 | A1* | 12/2016 | Yomo | G01S 7/4026 |
| | | | | 342/173 |
| 2018/0315877 | A1* | 11/2018 | Kelzenberg | H01L 31/052 |
| 2020/0203847 | A1* | 6/2020 | Gheorghian | H01Q 1/288 |

FOREIGN PATENT DOCUMENTS

| | | | | |
|---|---|---|---|---|
| CN | 110308425 A | * | 10/2019 | .............. G01S 7/02 |
| CN | 210835211 U | | 6/2020 | |
| DE | 2929814 A | * | 1/1981 | .......... G01S 7/4052 |
| DE | 19707590 C2 | | 12/2000 | |
| GB | 2291269 A | | 1/1996 | |
| JP | 2008268088 A | * | 11/2008 | |
| WO | 2016058678 A1 | | 4/2016 | |

OTHER PUBLICATIONS

JP2008268088A—translate—Google Patents.pdf (Year: 2008).*
DE_2929814A_translate.pdf (Year: 1981).*
German Search Report issued in German Patent Application No. 102020120181.8 dated Oct. 10, 2023. English translation not available.
International Search Report (ISR) issued in PCT application No. PCT/EP2021/069598 dated Jan. 5, 2022, with English translation of ISR.
Notice according to B article 94(3) EPO issued in European Application No. 21745737.3 dated Sep. 30, 2024 with English translation.
Notice according to Article 94(3) EPO issued in European Patent Application No. 21745737.3 dated Feb. 19, 2024 with English translation through google translate.

* cited by examiner

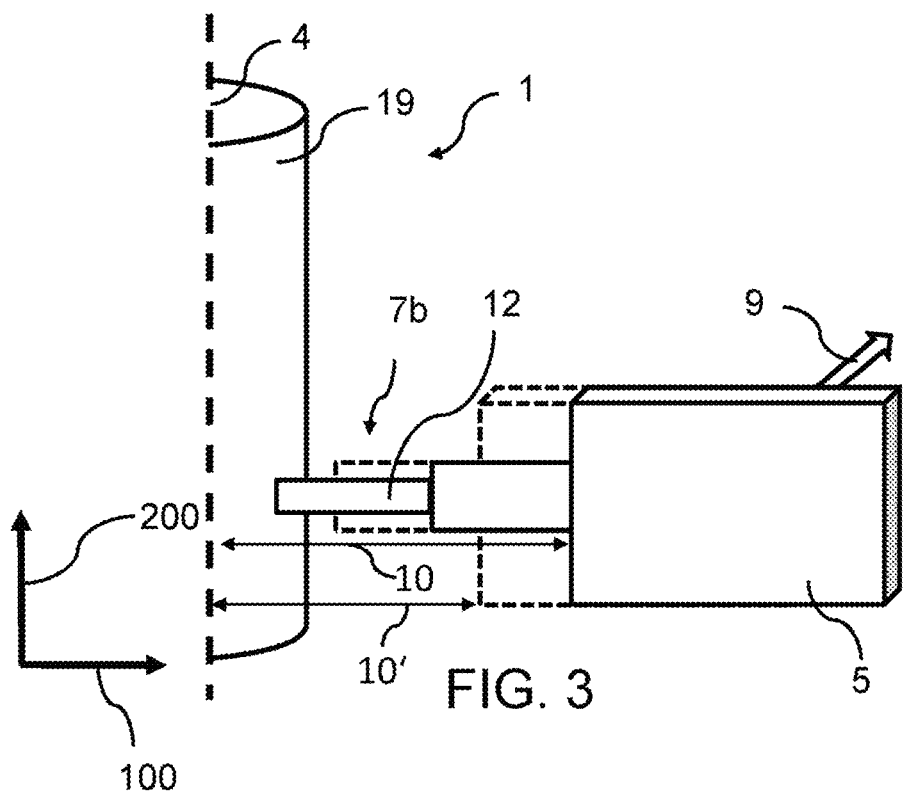
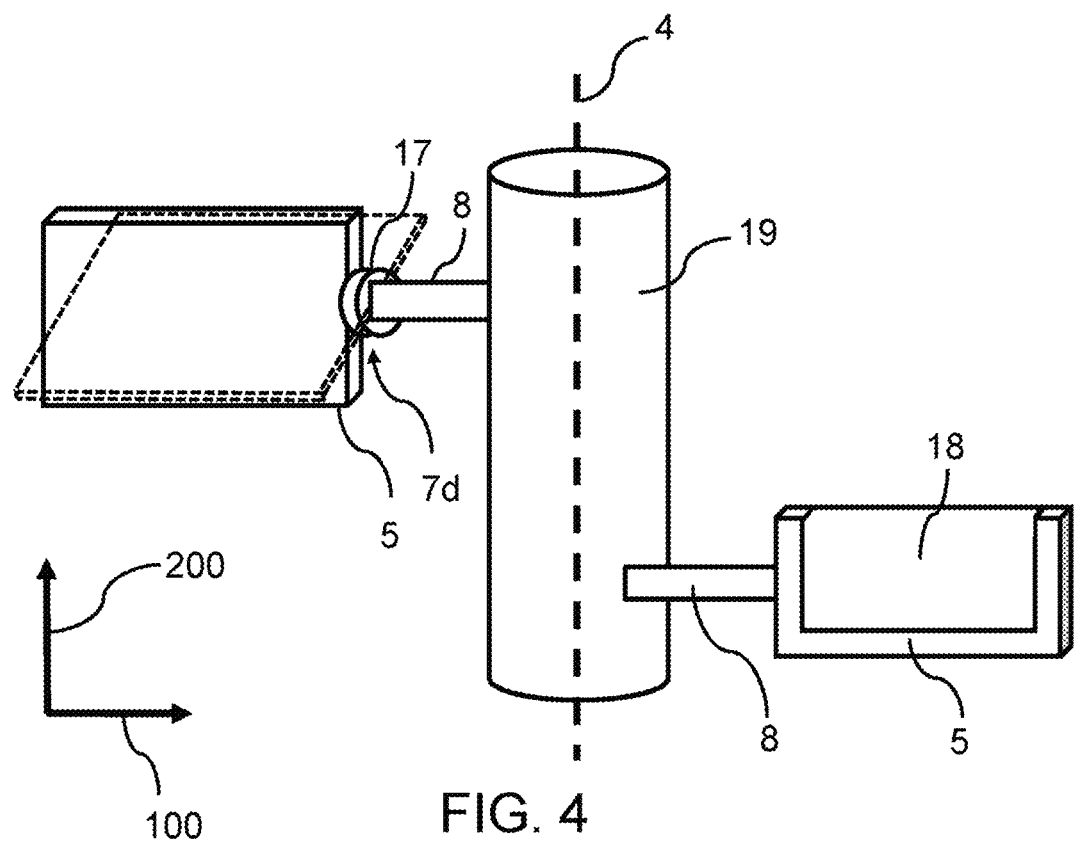

RADAR REFLECTOR FOR REFLECTING RADAR RADIATION AND SYSTEM FOR CONTROLLING AUTOMATED OPERATION OF A MOTOR VEHICLE

CROSS-REFERENCE TO RELATED APPLICATIONS

This application is a 371 application of PCT/EP2021/069598 filed Jul. 14, 2021 which claims benefit of and priority to German Patent Application Serial No. DE102020120181.8 filed Jul. 30, 2020, the disclosures of the above-identified applications are hereby incorporated by reference in their entirety.

The present disclosure relates to a radar reflector for reflecting radar radiation and a system for controlling automated operation of a motor vehicle comprising at least one such radar reflector and the motor vehicle.

From practice, motor vehicles, such as commercial vehicles, are known which are designed to perform a fixed sequence of driving maneuvers automatically. Such automated commercial vehicles are mainly used in an area separated from general road traffic, for example in a construction site area. Especially in these construction site areas, it may be necessary to change the road layout at short notice. This raises the task of how a sequence of driving maneuvers to be carried out automatically by the motor vehicle can be specified and/or changed as simply as possible by a worker on site.

From the prior art it is also known to support the driver-independent operation of vehicles, in particular when passing through road sections of increased accident risk, by roadside positioned radio beacons. In this context, document US 2018/0335781 A1 describes a beacon-equipped, autonomously operated vehicle for bi-directional communication with other beacons for the exchange of context-dependent travel information to support the autonomous operation of the vehicle. The travel information may include instructions for action, such as an advantageous bypass if there is a roadblock due to an accident or road blockage. Such instructions may be preset or pre-programmed and already in a beacon or in the operating system of the autonomous vehicle or may be made available to the autonomous vehicle. The disadvantage of the beacons used is that they are usually difficult for workers on site to handle due to the lack of expert knowledge, for example to adapt the beacons to changed conditions, for example to change the route and the instructions to be given in a construction site area.

Furthermore, radar reflectors for the reflection of radar radiation for radar applications are known from the prior art, i.e. devices which generate a particularly strong echo signal. For this purpose, radar reflectors may have at least one reflection element rotatable around a central axis of the radar reflector for the reflection of radar radiation. Although the known radar reflectors are robust and characterized by easy handling, they are usually less suitable for specifying more complex instructions for automated driving maneuvers of motor vehicles.

The object of the present disclosure is therefore to provide an improved technique which is easily adjustable for the local conditions, by means of which radar signals can be transmitted to a motor vehicle, preferably for the automated operation of the motor vehicle.

These objects are achieved by a radar reflector and the system with the characteristics of the independent claims. Advantageous embodiments and applications of the present disclosure result from the dependent claims and are explained in more detail in the following description with partial reference to the figures.

According to a first general aspect of the present disclosure, a radar reflector for the reflection of radar radiation is provided, comprising at least one reflector rotatable around a central axis of the radar for reflecting radar radiation. Due to the reflection element, which can be rotated around the central axis, at least part of the radar radiation incident on the radar reflector is reflected or sent back. In a known manner, the reflection element may, for example, have a suitable reflection surface, having a surface material or a coating which preferably has a higher reflectance compared to the surface of the other components of the radar reflector.

The radar reflector further comprises an adjusting device for changing and/or parameterizing a characteristic of a radar echo of the radar reflector, by means of which at least one of the following parameters can be changed: an angular velocity $\omega$ of a rotational motion of the at least one reflection element around the central axis, an effective reflection area $\sigma$ of the at least one reflection element for radar radiation, and a fastening position p of the at least one reflection element relative to the central axis. The term radar echo refers to the radiation reflected by the radar reflector. The fastening position p of the at least one reflection element relative to the central axis may include the radial distance of the at least one reflection element relative to the central axis and/or a position of the reflection element in the axial direction of the central axis. In other words, the adjusting device is designed in such a way that with the adjusting device a current value of at least one of the parameters $\omega$, $\sigma$ and p can be changed in order to change in this way a characteristic of the radar echo generated by the radar reflector in response to incident radar radiation. A change in the characteristics of the radar echo means that the signal characteristic, i.e. the signal properties of the radar echo, has changed from the point of view of a receiver of the radar echo, even if the emitted radar radiation or the radar radiation arriving at the radar reflector has remained unchanged. A characteristic reflection behavior can thus be generated by means of the adjusting device with different values of $\omega$, $\sigma$ and p.

Such a radar reflector, the characteristic radar echo of which can be changed, is particularly advantageous for providing instructions, preferably driving maneuver commands, for the automated operation of motor vehicles by means of the generated radar echo, if on the vehicle side a certain characteristic radar echo is assigned a predetermined instruction in each case, preferably a driving maneuver command. This means that the vehicle may be designed to perform a predetermined sequence of driving maneuvers automatically, in particular depending on received radar echoes.

With a single radar reflector according to the present disclosure, a plurality of different instructions, preferably driving maneuver commands, can be specified indirectly, i.e. by the respective set values of the parameters $\omega$, $\sigma$ and p, and the correspondingly generated characteristic of the radar echo can be codified.

The radar reflector is preferably a mobile, for example portable or movable, radar reflector, which facilitates positioning at different deployment locations. The radar reflector is preferably a passive radar reflector.

According to a particularly advantageous embodiment, at least two of the parameters $\omega$, $\sigma$ and p can be changed by means of the adjusting device for changing and/or parameterizing the characteristics of the radar echo of the radar reflector. This increases the number of different radar echo characteristics that can be generated. Preferably, all three parameters $\omega$, $\sigma$ and p can be changed for changing and/or parameterizing the characteristics of the radar echo of the radar reflector. A certain characteristic radar echo, which can be adjusted by means of the adjusting device, is assigned a certain value tuple of the parameters $\omega$, $\sigma$ and p. A characteristic reflection behavior can be produced by different values of $\omega$, $\sigma$ and p. In this way, a particularly large number of different characteristic radar echoes can be generated by means of relatively simple design measures, which reduces the technical effort.

The adjusting device may comprise a plurality of adjusting components, each of which is provided for adjusting one of the parameters $\omega$, $\sigma$ and p.

In one embodiment, a radial distance of the at least one reflection element from the central axis can be adjusted by means of the adjusting device for adjusting the fastening position p. The radial distance of the reflection elements affects the radar echo generated by the radar reflector. According to a development of the latter aspect, the adjusting device may comprise at least one support arm extending in the radial direction with respect to the central axis for adjusting the radial distance. The radial direction is a direction that is perpendicular to the direction of the central axis.

The support arm can be implemented as a telescopic arm and can carry the reflection element at its free end. It is conceivable, for example, that the telescopic arm can be locked in certain extension positions. In addition or alternatively, the reflection element can be supported on the support arm so as to be displaceable in the radial direction. For this purpose, the reflection element may, for example, be supported in a lockable guide rail on the support arm. The latter two alternatives represent structurally particularly simple, and thus cost-effective, realizations of the adjusting device which are not prone to failure.

According to a further embodiment, a position in the axial direction of the central axis of the at least one reflection element can be adjusted by means of the adjusting device for adjusting the fastening position p. In a further embodiment, in which the radar reflector has at least two reflection elements, the adjusting device is designed to change a distance of the reflection elements relative to each other in the axial direction of the central axis. This leads to a clearly detectable change in the radar echo characteristic generated by the radar reflector.

For example, the adjusting device may comprise a guide mechanism, by means of which the at least one reflection element is supported so as to be displaceable along the central axis for adjusting the position in the axial direction of the central axis. For example, the guide mechanism can be implemented as a guide rail or guide carriage along which the at least one reflection element can be locked at different positions. The adjustment of different characteristic radar echoes is thus made possible in a constructively simple way.

Alternatively or additionally, the adjusting device may comprise a plurality of insertion, latching and/or clamping positions along the central axis, to which the at least one reflection element can be selectively attached directly or indirectly. The insertion, latching and/or clamping positions can be realized, for example, by means of clamping screws, plug-in bolts, locking bolts, which engage in corresponding holes, threaded holes, etc. and fix the at least one reflection element along the central axis. The adjustment of various characteristic radar echoes is thus made possible in a constructively simple way.

According to a further embodiment, the radar reflector may further comprise a drive motor for producing a rotation of the at least one reflection element around the central axis. The drive motor can, for example, be in the form of an electric motor. The adjusting device may comprise a control element or an operating interface for controlling the drive motor for adjusting the angular velocity $\omega$, by means of which or via which the angular velocity $\omega$ can be adjusted continuously or in steps. The control element can be in the form of a toggle switch or rotary knob, for example. Preferably, the control element has a scale by means of which the angular velocity of the reflection element caused or the characteristic of the radar echo caused or the transmitted driving maneuver command can be read. This further simplifies the adjustment and generation of the desired radar echo.

The term effective reflection area $\sigma$ is used by analogy to the term radar cross-section, which is also widespread in radar technology, and refers to the effective area for the reflection of incoming radar radiation. The effective reflection area depends, for example, on the size of the reflection surface of the reflection element, its surface material and coating or the geometric orientation of the reflection surface in relation to the incident radar radiation.

In further embodiments, the adjusting device is further implemented to and/or has means to change the effective reflection area $\sigma$ specifically, in order to be able to change the characteristics of the radar echo in this way.

According to a further embodiment, the adjusting device may comprise a holder for adjusting the effective reflection area $\sigma$ by means of which a swivel position of the reflection element about the radial direction can be changed. In other words, the reflection element can, for example, be moved from an essentially perpendicular position with respect to a radial plane to a tilted position in which the effective reflection area becomes $\sigma$ smaller. The holder can be in the form of a lockable angled hinge, for example.

Alternatively or additionally, for adjusting the effective reflection area $\sigma$ the adjusting device may comprise a cover cap for selective attachment to a reflection surface of the reflection element, by means of which a portion of the reflection surface can be covered. The cover cap is made of a material that does not reflect radar radiation or at least reflects it less than the reflection surface of the reflection element, so that the effective reflection area of the reflection element is smaller overall. The cover cap can be attached to the reflection surface by means of press studs or Velcro, for example. This aspect enables a particularly simple constructive embodiment of the proposed radar reflector and thus offers cost advantages.

Alternatively or additionally, for adjusting the effective reflection area $\sigma$ the adjusting device may comprise a plurality of reflection elements with different effective reflection areas a. For example, these can be formed with differently sized reflection surfaces or reflection surfaces made of different material and may be interchangeably mounted on the radar reflector. In this way, a particularly rapid adjustment of the characteristics of the radar echo is possible.

According to a further embodiment, the radar reflector may comprise a base body rotatable around the central axis of the radar reflector and at least one support arm, which supports the reflection element, fastened to the base body and extending in the radial direction relative to the central axis. The base body may, for example, be cylindrical, post shaped or pylon shaped. This further simplifies the construction of the radar reflector. The central axis is particularly preferably a vertical axis. A version as a horizontal axis is also possible, for example.

According to a development of the latter embodiment, several support arms may be attached to the base body, each of which supports a reflection element, wherein preferably the support arms are arranged equidistant to each other when viewed in the circumferential direction of the base body. In other words, the support arms can be evenly distributed over the circumference of the base body. This can increase the signal strength of the radar echo.

Alternatively or additionally, exactly two support arms can be attached to the base body, each of which supports a reflection element. Preferably, the support arms can be 180° offset from each other when viewed in the circumferential direction of the base body, and thus arranged opposite each other relative to the central axis. According to a development of the latter aspect, the adjusting device may be designed so that an axial distance of the support arms from each other in the direction of the central axis can be changed. Alternatively or additionally, a distance of the support arms from each other when viewed in the circumferential direction of the base body can be variably adjustable, so that for example these are offset relative to each other only by 90° instead of by 180°. The adjustment of different characteristic radar echoes is thus made possible in a constructively simple way.

According to a development of the embodiment, in which the plurality of support arms is attached to the base body, for adjusting the axial distance of the support arms the adjusting device may have a guide mechanism by means of which the support arms are mounted so as to be displaceable along the central axis. For example, the guide mechanism may be implemented as a guide rail or guide carriage, along which the at least one reflection element can be locked at different positions. The adjustment of different characteristic radar echoes is thus made possible in a constructively simple way.

Alternatively or additionally, for adjusting the axial distance and/or the distance of the support arms from each other in the circumferential direction of the base body the adjusting device may comprise a plurality of insertion, latching and/or clamping positions along the central axis and/or in the circumferential direction of the base body, to which the support arms can be selectively attached. In this way, a particularly rapid adjustment of the characteristics of the radar echo is made possible.

Furthermore, the radar reflector may have markings which are provided on the base body at different positions in the axial direction and/or on the at least one support arm at different positions in the radial direction, for marking selectively adjustable positions of the reflection elements by means of the at least one support arm. The selectively adjustable positions may also be set, for example, for certain characteristics of the radar echo so that these are assigned to certain driving maneuver commands, which may be documented, for example, by an accompanying manual. This advantageously enables a particularly rapid and easily implementable change of the characteristic radar echo.

According to a development of the latter aspects, the radar reflector may further comprise an enclosure enclosing the base body, the at least one support arm and the at least one reflection element, which is permeable to radar radiation and at least partially evacuated, preferably a tube, more preferably a plastic tube. The term partial evacuation is understood here to mean that the air pressure inside the enclosure is lower than the atmospheric pressure outside the enclosure. The operation of the radar reflector is therefore low-resistance and protected against environmental influences, which reduces the susceptibility to errors.

According to a further embodiment, the radar reflector may further comprise a photovoltaic module arranged on a rear side of the at least one reflection element or on the enclosure for supplying power to the radar reflector. The photovoltaic module may be designed in a known manner to convert solar energy into electrical current for the energy supply of the radar reflector.

According to a further embodiment, the radar reflector may further comprise a communication interface for wireless data communication, wherein the adjusting device is designed to change the angular velocity ω and/or to switch off the radar reflector depending on a control command received via the communication interface. By way of example, the control command can be converted by means of the communication interface into control voltages for the drive motor implemented as an electric machine and can cause a change in the angular velocity. This simplifies the operation of the adjusting device.

The proposed radar reflector offers the advantage over known solutions that the characteristic radar echo can be changed or adjusted by means of simple design measures or adjustments to the operating parameters of the radar reflector. In this respect, the adjustment does not require expert knowledge. The proposed radar reflector is thus particularly advantageously suitable for use in environments in which the local conditions require short-term adjustments for the automated operation of motor vehicles, such as in construction site areas, wherein driving maneuver commands for the motor vehicle are to be specified by means of radar reflectors. By means of a plurality of radar reflectors of basically the same constructive design, the targeted adjustment of the aforementioned parameters can also be used, for example, to realize complex path guidance by means of a plurality of radar reflectors lined up one after the other. The radar reflectors, which are identical in their basic configuration, offer advantages in terms of manufacturing costs compared to radar reflectors with different designs. Overall, this results in a significantly reduced technical effort in the realization and adjustment of the automated operation of motor vehicles.

According to a second general aspect of the present disclosure, a system for controlling the automated operation of a motor vehicle is provided.

The system comprises at least one radar reflector as described in this document, i.e. comprising an adjusting device for changing and/or parameterizing a characteristic of a radar echo of the radar reflector. The system further comprises a motor vehicle which has a radar sensor and is designed to perform a predetermined sequence of driving maneuvers automatically, which can be predetermined, at least in part, by a received radar echo. The radar sensor may be designed, for example, to transmit radar radiation and to receive a radar echo and, for example, to transmit to a control device of the motor vehicle.

The term driving maneuver can be understood here, for example, to mean certain standard maneuvers that can be carried out with the motor vehicle itself or with attachments or auxiliary units of the motor vehicle, preferably instructions for driving maneuvers, for local navigation and traffic sign information.

The motor vehicle is further designed to receive a radar echo of the at least one radar reflector, for example by means of the radar sensor, and to determine a characteristic of the radar echo, for example by evaluation and comparison of the received radar echo with stored parameters.

The motor vehicle is further designed to identify the radar reflector by means of an association stored in a database between different characteristics of the radar echo and associated identifiers for identifying the radar reflector.

According to a further embodiment, the motor vehicle may be designed to select a driving maneuver from a set of predetermined driving maneuvers depending on the identification of the radar reflector and to perform them automatically.

The automated operation of the motor vehicle can result solely from a sequence of driving maneuver commands.

It has already been found above that a characteristic reflection behavior (radar echo) can be generated by various values of ω, σ and p, which can be adjusted by means of the adjusting device on the radar reflector.

According to a particularly preferred embodiment, for determining the characteristics of the radar echo based on the received radar echo, the motor vehicle may be designed to determine at least one of the following variables: a change with time, preferably a so-called flashing, of the radar echo, a tangential velocity magnitude of the at least one reflection element measured by means of the Doppler effect, a reflectance or an effective reflective area σ of the radar reflector, and a tangential velocity difference of the reflection elements measured by means of the Doppler effect.

These variables above are affected by different values of ω, σ and p.

The change of the radar echo with time and a tangential velocity magnitude of the at least one reflection element measured by means of the Doppler effect depends, for example, on the angular velocity ω of the rotational motion of the at least one reflection element around the central axis. A changed effective reflection area σ of the at least one reflection element can be detected by means of the power density received by the radar sensor of the motor vehicle. For example, flashing can mean an increase and decrease in the strength of the radar echo.

The preferred embodiments and features of the present disclosure described above can be combined with each other as desired. Further details and advantages of the present disclosure are described below with reference to the attached drawing. In the figures:

FIG. 3 shows a radar reflector according to a further embodiment in a partial view;

FIG. 4 shows a radar reflector according to a further embodiment;

Identical or functionally equivalent elements are denoted in all figures by the same reference signs and are sometimes not described separately.

Figure 2:
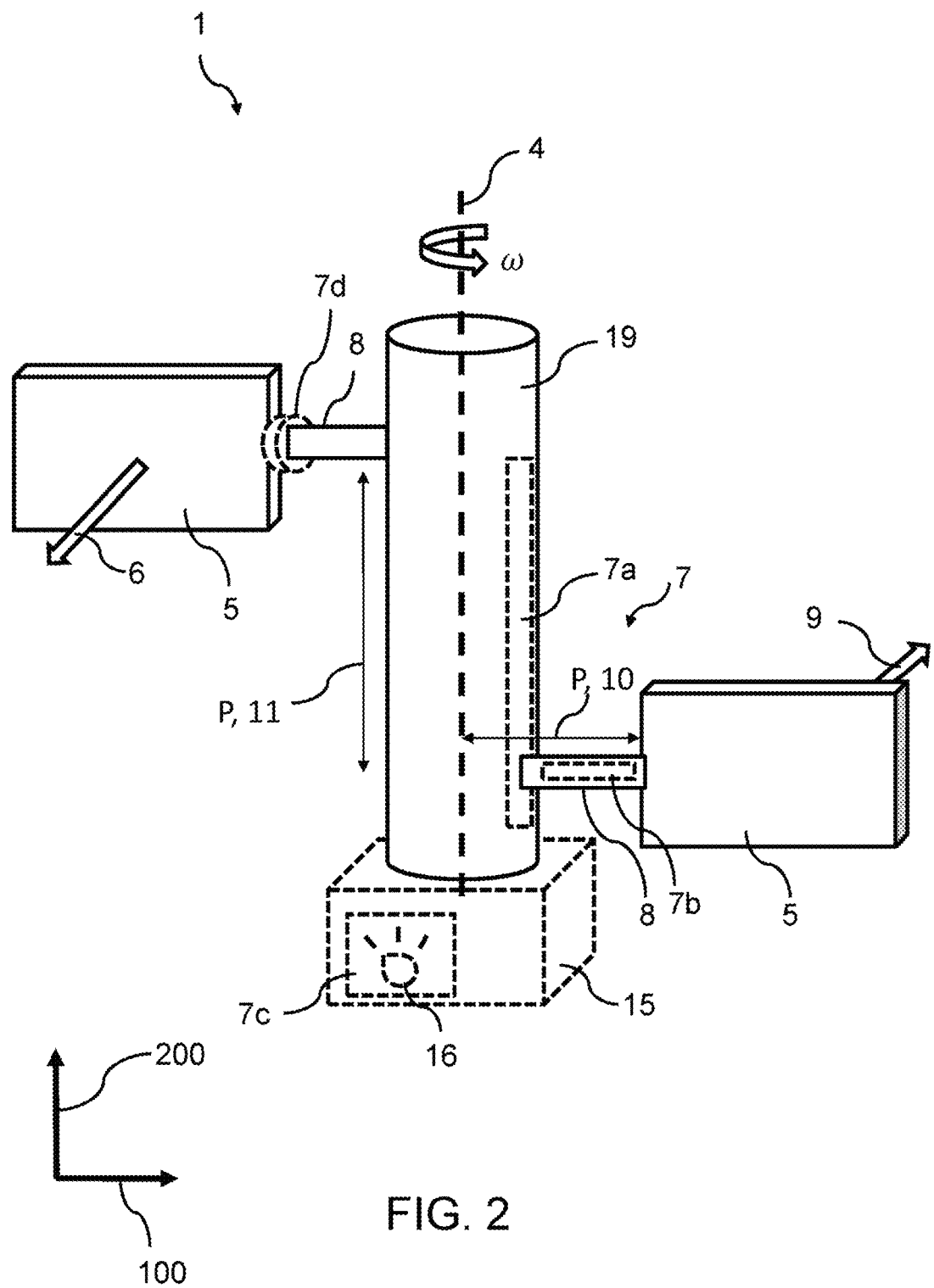
FIG. 2 shows a radar reflector according to a first embodiment.

FIG. 2 shows a highly schematic representation of a radar reflector 1 for the reflection of radar radiation according to a first embodiment. For example, the reference sign 1 in all embodiments of FIGS. 2 to 6 denotes a radar reflector, which is designed differently depending on the embodiment and variant.

The radar reflector 1 comprises a base body 19 rotatable around a central vertical axis 4 of the radar reflector 19, two support arms 8 rotationally fixedly fastened to the base body 19 and extending in the radial direction 100 relative to the central axis 4, each supporting a reflection element 5 for radar radiation at their free ends. The reflection element 5 can also be referred to as a radar reflector vane. The support arms 8 or the reflection elements 5 are—when viewed in the circumferential direction of the base body 19—equidistantly arranged relative to each other, i.e. 180° offset from each other and thus arranged opposite each other relative to the central axis 4. A fastening position p of the reflection element 5 relative to the central axis 4 is determined by the radial distance 10 of the reflection element 5 from the central axis 4 and by the axial position, i.e. the position in the axial direction 200, of the reflection element 5, in particular by the axial distance 11 of the two reflection elements 5 relative to each other in the axial direction 200.

The base body 19 has a drive connection to a drive motor 15, for example an electric motor, by means of which the base body and thus the radar reflector 1 can be set in rotational motion around the central vertical axis 4. ω denotes the angular velocity of the rotational motion about the axis 4.

The reflection elements 5 are designed for reflecting radar radiation 2 and have a suitable material for reflecting radar radiation. The extent to which incoming radar radiation 2 is reflected by the reflection elements 5 depends on the effective reflection area σ of the reflection elements 5. The effective reflection area σ is used in the present embodiment as an analogy to the concept of the term radar cross-section widespread in radar technology. The effective reflection area σ depends, among other things, on the size of the lateral surfaces and their surface material or coating. During operation of the radar reflector 1, the reflection elements 5 rotate with the angular velocity ω of the rotational movement around the axis 4 and accordingly reflect radar radiation incident on them.

The characteristic reflection behavior of the radar reflector 1, i.e. the characteristic of the radar echo, depends on the values of the parameters ω, σ and p. For example, the characteristic reflectance values of the reflection elements 5 influence the strength of the radar echo. The radar echo received by a radar sensor is also influenced by the geometric arrangement p of the reflection elements 5, i.e. the fastening position p of the reflection elements 5 relative to the central axis, for example the axial distance 11 and/or the radial distance 10 of the reflection elements 5. Also, the characteristic change of the reflection values with time (also called "flashing") depends on the angular velocity ω with which the effective radar cross-section changes in time due to the rotational movement around the axis 4. An advantage of this type of radar reflectors 1 is that the tangential velocity difference (2*v=2*ω*r) of the reflection elements 5 can be easily detected by radars by means of the Doppler effect. Accordingly, the tangential velocity magnitude |v| of the reflection elements 5 can be reliably measured with the Doppler effect. The reference signs 6 and 9 denote the tangential velocities of the two reflection elements 5 in FIG. 2.

The values of the rotational velocity ω, the effective reflection area σ, the fastening position p of the axial distance 11 and the radial distance 10 of the reflection elements 5 thus lead to a characteristic reflection behavior, i.e. a characteristic radar echo, of the radar reflector 1. In other words, a tuple of the parameters ω, σ and p describes an identifiable characteristic of a reflector, thus allowing an assignment of an identifier (ID) to a radar reflector 1. A motor vehicle 23 with a radar sensor 24 can thus identify a particular radar reflector 1 based on its characteristic reflection behavior by evaluating the received radar echo 3 (see illustration in FIG. 1), if a corresponding association between an identifier of the radar reflector 1 and characteristic radar echoes 3 associated with this radar reflector 1 was previously deposited in the vehicle, for example in a database, which is described in more detail below in connection with FIG. 1.

It has already been stated above that a special feature of the radar reflector 1 according to the present disclosure is that the characteristic of the radar echo 3 of the radar reflector 1 can be changed in a targeted manner.

For changing and/or parameterizing the characteristics of the radar echo 3 of the radar reflector 1, the radar reflector 1 comprises an adjusting device 7, by means of which at least one of the following parameters ω, σ and p can be changed. The adjusting device 7 may comprise a plurality of versions or adjusting components 7a, 7b, 7c and 7d, each of which is provided for adjusting one of the parameters ω, σ and p. The adjusting device 7 shown in the figures may comprise one, several or all of the versions 7a, 7b, 7c and 7d.

By means of the adjusting device 7a, the distance 11 in the axial direction 200 of the two reflection elements 5 relative to each other can be changed here, for example, by adjusting the position in the axial direction 200 of the right reflection element 5.

By means of the adjusting device 7b, the radial distance 10 of the two reflection elements 5 from the central axis 4, i.e. the position of the reflection elements 5 in the radial direction 100, can be changed, wherein this is shown only for the right reflection element 5 in FIG. 2 for better clarity.

By means of the adjusting device 7c, the angular velocity ω of the rotational movement of the reflection elements 5 can be adjusted. For this purpose, the adjusting device 7c comprises a control element 16 for controlling the drive motor 15 to adjust the angular velocity ω of the rotational movement of the reflection elements 5, for example to adjust it in steps.

By means of the adjusting device 7d, a swivel position of the two reflection elements 5 about the radial direction 100 can be changed, wherein this is shown only for the left reflection element 5 in FIG. 2 again for better clarity.

FIGS. 3 to 6 show schematic representations of further variants of the radar reflector 1.

FIG. 3 illustrates a possible version of the adjusting device 7b for adjusting a radial distance 10 of the reflection elements 5 from the central axis 4 in a partial view. The adjusting device 7b is designed here by way of example as a telescopic arm 12 to form the support arms 8 of the reflection elements 5. By pushing the telescopic arm 12 together, the radial distance 10 of the respective reflection element 5 can be shortened to a radial distance 10'. The change in the radial distance 10 entails (via the known relationship: tangential velocity magnitude 9=angular velocity ω *radial distance 10) a change in the tangential velocity magnitude 9, which affects the characteristics of the radar echo 3. Based on the tangential velocity magnitude 9, the radar reflector 1 can be identified.

FIG. 4 shows two possible versions of the adjusting device 7d for adjusting an effective reflection area σ of the radar reflector 1. The first version of the adjusting device 7d comprises a holder 17 with which the reflection elements are each held on one of the support arms 8 so as to be pivotally movable. By means of the holder 17, the swivel position about the radial direction 100 of the reflection elements 5 can be changed. As a result, the effective area for reflecting the incident radar radiation 2 changes. The effective reflection area σ can thus be changed by means of the swivel angle. The holder 17 may comprise a lock for fixing the reflection elements in the desired swivel position in each case.

The second version of the adjusting device 7d comprises a cover cap 18, which can optionally be mounted on the reflection element 5. The cover cap 18 is detachably attached to the right reflection element 5 here. The cover cap 18 has a surface that reflects radar radiation 2 less strongly than the reflection surface of the right reflection element 5. By applying the cover cap 18, the effective reflection area σ of the reflection element 5 is thus smaller.

By targeted adjustment of the swivel position of the reflection elements 5 and/or application of the cover cap 18 to the two reflection elements 5, characteristic radar echoes 3 for identifying the radar reflector 1 can thus be generated.

It is emphasized that the holder 17 and the cover cap 18 in FIG. 4 are shown only on one of the reflection elements 5 for better clarity. However, a holder 17 for changing the swivel position may be provided on both reflection elements 5. The same applies to the cover cap 18. Furthermore, the holders 17 and the cover caps 18 can be used both together and individually.

Figure 5:
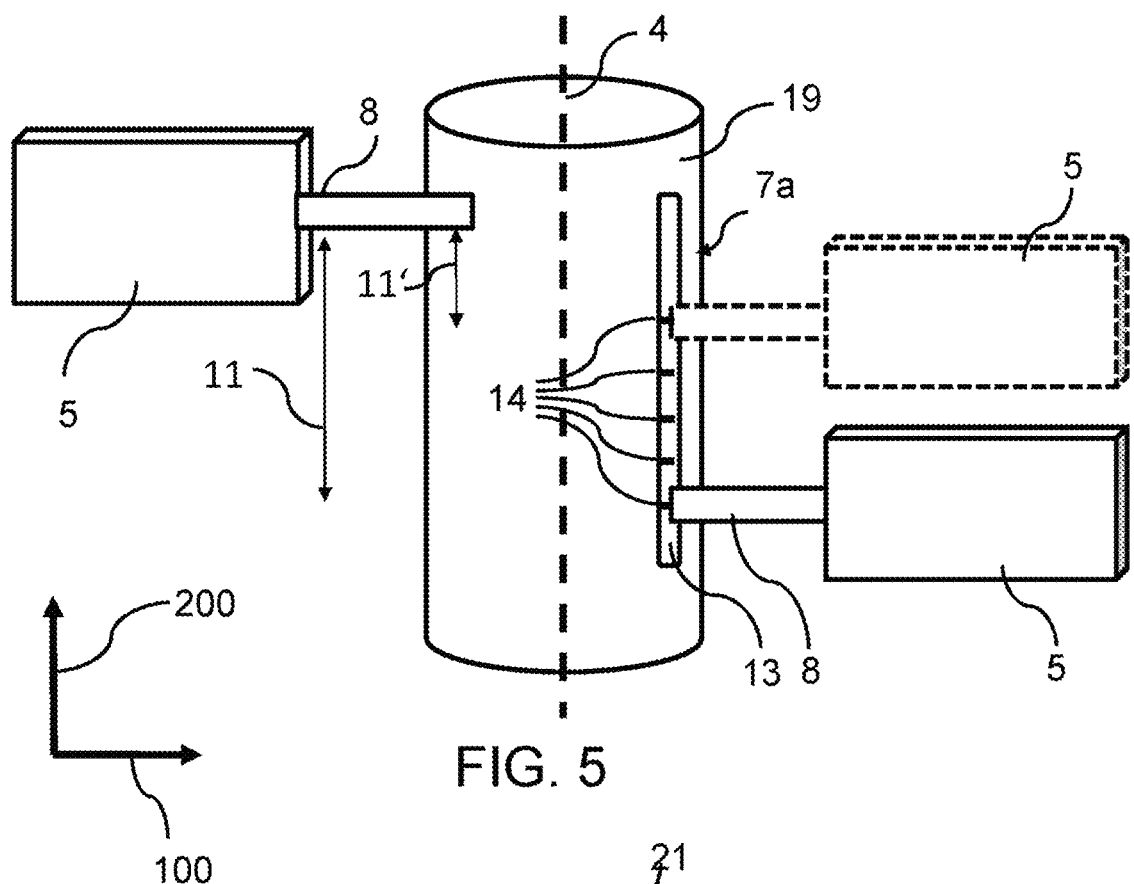
FIG. 5 shows a radar reflector according to a further embodiment.

FIG. 5 illustrates a further possible version of the adjusting device 7 for adjusting an axial distance 11 of the reflection elements 5.

The adjusting device 7a comprises the guide mechanism 13, for example a guide rail, by means of which the right reflection element 5 is supported so as to be displaceable along the central axis 4 of the radar reflector 1. Alternatively or additionally, the adjusting device 7a comprises a plurality of insertion, latching and clamping positions 14 along the central axis 4, to which the at least one reflection element 5 can be selectively attached directly.

Figure 6:
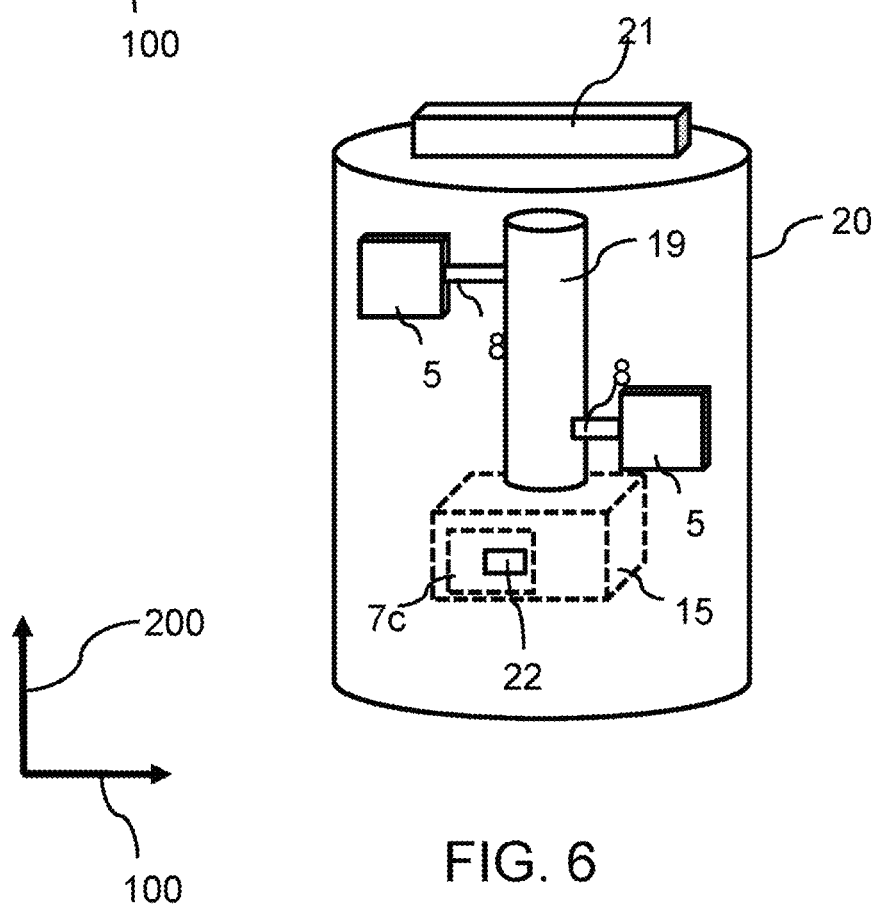
FIG. 6 shows a radar reflector according to a further embodiment.

FIG. 6 shows a further version of the radar reflector 1.

The radar reflector 1 has an enclosure 20 enclosing the base body 19, the two support arms 8 and the reflection elements 5 which is permeable for radar radiation 2, at least partially evacuated and in the form of a plastic tube. The internal volume of the enclosure 20 has a lower air pressure compared to the environment. The operation of the radar reflector 1 can thus be carried out with particularly low resistance and protected against environmental influences.

A photovoltaic module 21 for the power supply of the radar reflector 1 is arranged on the enclosure 20. The photovoltaic module 21 is designed for converting solar energy into electric current in a known manner and serves as a self-sufficient power supply of the drive motor 15 in the form of an electric machine.

Instead of the control element 16, the adjusting device 7c for changing the angular velocity ω comprises a wireless communication data interface 22, which is designed to receive control commands for controlling the drive motor 15 and thus for adjusting the angular velocity ω. Furthermore, the radar reflector 1 can be switched on and off by means of the adjusting device 7c.

The versions of the radar reflector 1 described above by way of example are thus characterized in that means are provided in the form of the adjusting device 7 by means of which the characteristic of the radar echo 3 of the radar reflector 1 can be changed in a targeted manner by changing a value tuple of the parameters, ω, σ and p.

Figure 1:
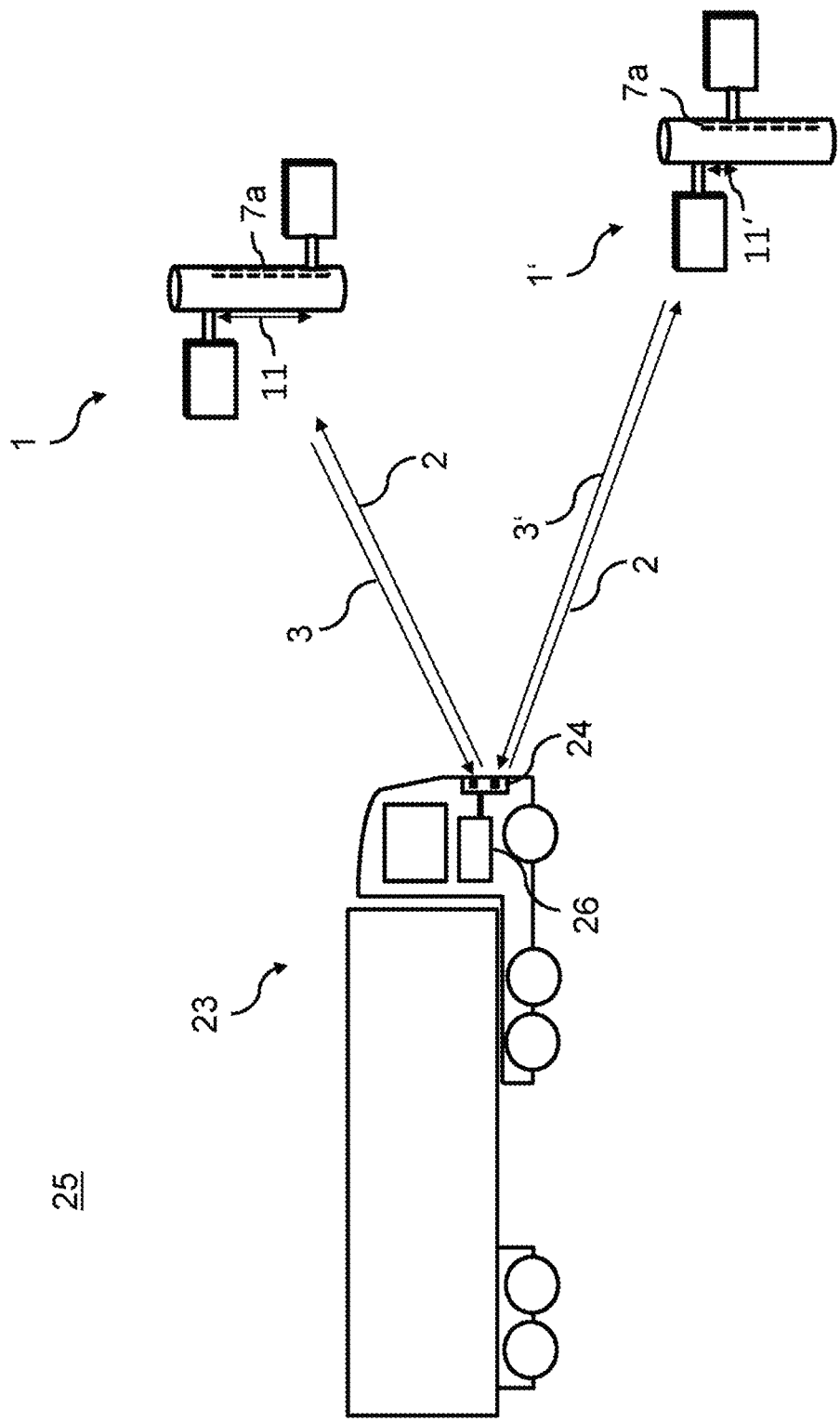
FIG. 1 shows a system for controlling automated operation of a motor vehicle according to one embodiment.

Such a radar reflector 1 finds an advantageous application in systems for controlling the automated operation of a motor vehicle 23. This is described by way of example in FIG. 1. FIG. 1 shows a system 25 for controlling the automated operation of a motor vehicle 23 according to an embodiment wherein radar reflectors 1, 1' are used as described above.

Here, radar radiation 2 is reflected by a radar reflector 1, 1' while generating characteristic radar echoes 3, 3'. For example, driving maneuvers for automated operation of the motor vehicle 23 are derived in the vehicle from radar echoes 3, 3' in a motor vehicle 23 designed for automated operation. A certain characteristic radar echo 3 represents a certain driving maneuver, which is to be carried out automatically by the motor vehicle 23. The assignment of which characteristic radar echo 3 corresponds to which driving maneuver has previously been stored in the motor vehicle 23.

The assignment is also documented, for example, in the form of a work manual, on the basis of which a worker who wants to specify a certain sequence of driving maneuvers to the motor vehicle 23 on a construction site, for example, can determine how he must adjust the radar reflectors 1, 1' by means of the adjusting device 7 in each case, so that they each produce a certain characteristic reflection behavior, which corresponds to the driving maneuver command which the worker wants to prescribe. Here, for example, a certain value tuple of the parameters, ω, σ and p can be assigned to a certain driving maneuver command. Accordingly, the worker can adjust the radar reflector 1 by means of the adjusting device 7 on the basis of specific specifications, for example by adjusting the rotational velocity ω or the axial distance 11 of the reflection elements 5 to predetermined values assigned to a certain driving maneuver command. The radar reflector 1, 1' then generates the desired characteristic radar echoes 3, 3', which are then converted into the assigned driving maneuver command by the corresponding programmatically equipped motor vehicle 23. In this way, for example, adjustments to the specification for the automated operation of the motor vehicle 23 can be made without great effort and in particular without expert knowledge.

The automated operation of the motor vehicle 23 is thus at least partially (remotely) controlled in this respect by the radar reflectors 1, 1' set up in a certain order. A desired route and behavior of the motor vehicle 23 can be predetermined in this way simply by setting up such mobile radar reflectors 1, 1' and furthermore can be quickly and easily changed and adjusted by changing the set-up and/or the characteristic radar echo 3, 3'.

In the embodiment shown in FIG. 1, the system 25 comprises only two radar reflectors 1, 1' by way of example. These differ in that they have been adjusted by means of the adjusting device to different value tuples of the parameters, ω, σ and p, so that they generate different characteristic radar echoes 3, 3'.

The system 25 further comprises a motor vehicle 23 having a radar sensor 24 and being designed to perform a predetermined sequence of driving maneuvers automatically. The driving maneuvers are at least partly determined by the radar echoes 3, 3' of the radar detectors 1, 1'. This means that the motor vehicle 23 is designed to perform a correspondingly assigned driving maneuver when receiving a certain radar echo 3, 3'.

The radar sensor 24 is designed to transmit radar radiation 2 and receive radar echoes 3, 3'. In the embodiment shown, radar radiation 2 is reflected by way of example by a radar reflector 1 in a characteristic manner while generating a radar echo 3. The radar sensor 24 is further designed to transmit the received radar echo 3 to a control device 26 of the motor vehicle 23. The control device 26 is designed to determine a characteristic of the radar echo 3.

To determine the characteristics of the radar echo 3 on the basis of the received radar echo 3, the control device 26 can determine at least one of the following variables: a change of the radar echo 3 with time, preferably a so-called flashing, a tangential velocity magnitude of the at least one reflection element 5 measured by means of the Doppler effect, a reflectance or an effective reflection area σ of the radar reflector, and a tangential velocity difference of the reflection elements 5 measured by means of the Doppler effect. The above variables are affected by different values of ω, σ and p. In the context of previously carried out tests and test drives, it can be experimentally determined how characteristic radar echoes 3, 3' can be distinguished from each other on the basis of these variables.

The association between different characteristics of the radar echoes 3, 3' and identifiers of the radar reflectors 1, 1' and/or direct driving maneuvers is stored in a database. The control device 26 identifies the radar reflector 1 by means of the received radar echo 3 and the association stored in the database. In the example shown, the control device 26 assigns the radar echo 3 to the radar reflector 1.

The motor vehicle 23 is designed to select a driving maneuver from a set of predetermined maneuvers depending on the identification of the radar reflector 1, 1' and to perform them automatically.

In the exemplary embodiment shown, the motor vehicle 23 first approaches the radar reflector 1 and derives a driving maneuver for automated operation in the manner described above. The term driving maneuver may be understood, for example, to mean certain standard maneuvers feasible with the motor vehicle 23 itself or with attachments or auxiliary units of the motor vehicle 23, preferably instructions for driving maneuvers, for local navigation and traffic sign information. Here, the motor vehicle 23 selects the associated driving maneuver only by way of example from the identification of the radar reflector 1 and carries it out to drive tangentially past the radar reflector 1.

Due to the tangential passage past the radar reflector 1, the motor vehicle 23 approaches the radar reflector 1'. The motor vehicle 23 receives a radar echo 3', the characteristics of which differ from the characteristics of the previously received radar echo 3. The motor vehicle 23 detects that the radar echo 3' is reflected by another radar reflector 1', here the radar reflector 3' and that now another driving maneuver is to be carried out for automated operation. Here, the derived driving maneuver, merely by way of example, causes the motor vehicle 23 to initiate cornering.

By cornering, the motor vehicle 23 could accordingly move into the vicinity of another radar reflector 1' (not shown here) and derive the next driving maneuver from its identification, etc. Fully automated operation of the motor vehicle 23 results from the sequential series of derived driving maneuvers in the embodiment shown. A worker on a construction site can thus prescribe a sequence of desired driving maneuvers by sequential installation of several radar reflectors 1, 1', which are then carried out by a suitably equipped motor vehicle 23.

Although the present disclosure has been described with reference to certain exemplary embodiments, it is apparent to those skilled in the art that various modifications can be carried out and equivalents can be used as substitutes without departing from the scope of the present disclosure. Consequently, the present disclosure should not be limited to the disclosed exemplary embodiments but should include all exemplary embodiments that fall within the scope of the attached claims. In particular, the present disclosure also claims protection for the subject matter and features of the sub-claims independently of the claims referred to.

REFERENCE SIGN LIST 1, 1' Radar reflector
2 Radar radiation 3, 3' Radar echoP
4 Central axis of the radar reflector
5 Reflection element
6 Tangential velocity magnitude of the first reflection element
7, 7a . . . d Adjusting device
8 Support arm
9 Tangential velocity magnitude of the second reflection element
10, 10' Radial distance
11, 11' Axial distance
12 Telescopic arm
13 Guide mechanism
14 Insertion, latching and clamping positions along central axis
15 Drive motor
16 Control element
17 Holder
18 Cover cap
19 Base body
20 Enclosure
21 Photovoltaic module
22 Communication interface
23 Motor vehicle
24 Radar sensor
25 System
26 Control device
100 Radial direction
200 Axial direction
p Fastening position
σ Effective reflecting area
ω Angular velocity

The invention claimed is:

1. A radar reflector for reflection of radar radiation, comprising
at least two reflection elements rotatable about a central axis of the radar reflector for the reflection of radar radiation, characterized by
an adjusting device for changing or parameterizing a characteristic of a radar echo of the radar reflector, by means of which at least the following parameter can be changed, in order to change in this way the characteristic of the radar echo generated by the radar reflector in response to incident radar radiation:
a fastening position p of the at least two reflection elements relative to the central axis, wherein for adjusting the fastening position p by means of the adjusting device, a first position in the axial direction of the central axis of the at least two reflection elements can be adjusted, wherein the adjusting device is designed to change a distance of the at least two reflection elements relative to each other in the axial direction of the central axis, wherein for adjusting the first position in the axial direction of the central axis, the adjusting device
(a) has a guide mechanism by means of which the at least two reflection elements are supported so as to be displaceable along the central axis; or
(b) comprises a plurality of insertion, latching and/or clamping positions along the central axis to which the at least one two reflection elements can be selectively attached directly or indirectly.

2. The radar reflector as claimed in claim 1, wherein by means of the adjusting device, at least two of the parameters ω, σ, and p can be changed to change and/or parameterize the characteristic characteristics of the radar echo of the radar reflector, wherein the parameters include the fastening position p and at least one of an angular velocity ω or an effective reflection area σ of at least one reflection element of the at least two reflection elements.

3. The radar reflector as claimed in claim 2, wherein by means of the adjusting device all three of the parameters ω, σ and p can be changed to change and/or parameterize the characteristic of the radar echo of the radar reflector.

4. The radar reflector as claimed in claim 2, further comprising a drive motor for generating a rotation of the at least one reflection element, of the at least two reflection elements, around the central axis, wherein for adjusting the angular velocity ω, the adjusting device has a control element or an operating interface for controlling the drive motor, via which the angular velocity ω can be adjusted continuously or in steps.

5. The radar reflector as claimed in claim 2, wherein for adjusting the effective reflection area σ, the adjusting device
(a) comprises a holder by means of which a swivel position of the at least one reflection element, of the at least two reflection elements, around a radial direction can be changed; or
(b) comprises a cover cap for selective attachment to a reflection surface of the at least one reflection element, of the at least two reflection elements, by means of which part of the reflection surface can be covered; or
(c) comprises a plurality of reflection elements having different effective reflection areas σ with different sizes of reflection surface, or reflection surfaces made of different material, which can be mounted on the radar reflector so as to be interchangeable with each other.

6. The radar reflector as claimed in claim 2, further comprising a communication interface for wireless data communication, wherein the adjusting device is designed to change the angular velocity ω or to switch off the radar reflector depending on a control command received via the communication interface.

7. The radar reflector as claimed in claim 1, wherein for adjusting the fastening position p by means of the adjusting device, a radial distance of at least one reflection element, of the at least one two reflection elements, from the central axis can be adjusted.

8. The radar reflector as claimed in claim 7, wherein for adjusting the radial distance, the adjusting device has at least one support arm extending in a radial direction relative to the central axis,
(a) which is implemented as a telescopic arm and supports the at least one reflection element, of the at least two reflection elements, at it's free end, or
(b) on which the at least one reflection element, of the at least two reflection elements, is supported so as to be displaceable in the radial direction.

9. The radar reflector as claimed in claim 1, comprising
(a) a base body rotatable around the central axis of the radar reflector;
(b) at least one support arm fastened to the base body and extending in a radial direction relative to the central axis and which supports at least one reflection element of the at least two reflection elements.

10. The radar reflector as claimed in claim 9, wherein the at least one support arm includes a plurality of support arms attached to the base body, each of which supports a reflection element of the at least two reflection elements.

11. The radar reflector as claimed in claim 10, wherein the plurality of support arms are arranged equidistant from each other when viewed in a circumferential direction of the base body.

12. The radar reflector as claimed in claim 11, wherein the adjusting device is designed in such a way that:

(a) a distance of the plurality of support arms from each other in the axial direction of the central axis can be changed; or
(b) a distance of the plurality of support arms from each other in the circumferential direction of the base body is variably adjustable.

13. The radar reflector as claimed in claim 12, wherein for adjusting the distance of the plurality of support arms, the adjusting device
(a) has a guide mechanism by means of which each support arm is supported so as to be displaceable along the central axis; or
(b) comprises a plurality of insertion, latching or clamping positions along or in the circumferential direction of the base body to which the plurality of support arms can be selectively attached.

14. The radar reflector as claimed in claim 9, further comprising markings provided on the base body at different positions in the axial direction or on the at least one support arm at different positions in the radial direction for marking positions of the at least two reflection elements selectively adjustable by means of the at least one support arm.

15. The radar reflector as claimed in claim 9, further comprising an enclosure, which is permeable for radar radiation and at least partially evacuated, enclosing the base body, the at least one support arm and the at least two reflection elements.

16. The radar reflector as claimed in claim 15 wherein the enclosure is a tube or the enclosure is a plastic tube.

17. The radar reflector as claimed in claim 15, further comprising a photovoltaic module arranged on a rear side of the at least two reflection elements or on the enclosure for supplying power to the radar reflector.

18. The radar reflector as claimed in claim 9, wherein the at least one support arm includes exactly two support arms are attached to the base body, each supporting a reflection element, wherein the two support arms are offset from each other by 180° when viewed in a circumferential direction of the base body and are thus arranged opposite each other relative to the central axis.

19. The radar reflector as claimed in claim 1, further comprising at least one of the following parameters that can be changed:
(a) an angular velocity ω of a rotational motion of the at least two reflection elements around the central axis; or
(b) an effective reflection area σ of at least two reflection elements for radar radiation.

20. A system for controlling an automated operation of a motor vehicle, comprising
a) at least one radar reflector as claimed in claim 1; and
b) a motor vehicle comprising a radar sensor and designed to perform a predetermined sequence of driving maneuvers automatically,
wherein the motor vehicle is designed to receive a radar echo of the at least one radar reflector, to determine a characteristic of the radar echo and to identify the radar reflector by means of an association stored in a database between different characteristics of the radar echo and associated identifiers for identifying the radar reflector.

21. The system as claimed in claim 20, wherein for determining the characteristic of the radar echo on the basis of the received radar echo, the motor vehicle is designed to determine at least one of the following variables: a change of the radar echo with time, a tangential velocity magnitude of the at least two reflection elements measured by means of a Doppler effect, a reflectance or an effective reflective area σ of the radar reflector, and a tangential velocity difference of the at least two reflection elements measured by means of the Doppler effect.

22. The system as claimed in claim 21, wherein the change of the radar echo with time is a flashing.

23. The system as claimed in claim 20, wherein the motor vehicle is designed to select a driving maneuver from a set of predetermined driving maneuvers depending on the identification of the radar reflector and to perform them automatically.

* * * * *